US007686029B2

(12) United States Patent
Nakao

(10) Patent No.: US 7,686,029 B2
(45) Date of Patent: Mar. 30, 2010

(54) MICROFLUIDIC DEVICE FOR TRAPPING AIR BUBBLES

(75) Inventor: Tomoki Nakao, Kawaguchi (JP)

(73) Assignee: Enplas Corporation, Saitama (JP)

( * ) Notice: Subject to any disclaimer, the term of this patent is extended or adjusted under 35 U.S.C. 154(b) by 655 days.

(21) Appl. No.: 11/605,593

(22) Filed: Nov. 28, 2006

(65) Prior Publication Data

US 2007/0125434 A1 Jun. 7, 2007

(30) Foreign Application Priority Data

Dec. 2, 2005 (JP) ............................ 2005-349571

(51) Int. Cl.
*B01D 19/00* (2006.01)

(52) U.S. Cl. ...................................... 137/177; 137/833

(58) Field of Classification Search ................. 137/833, 137/177; 366/336, 337, 338
See application file for complete search history.

(56) References Cited

U.S. PATENT DOCUMENTS 6,130,098 A * 10/2000 Handique et al. ........... 436/180
6,368,871 B1 * 4/2002 Christel et al. ............. 436/180
2004/0189311 A1 9/2004 Glezer et al.
2004/0228764 A1 11/2004 Stephens et al.
2005/0121604 A1 6/2005 Mueth et al.
2006/0014269 A1 1/2006 Streit et al.
2006/0216213 A1 9/2006 Biwa et al.
2006/0275852 A1 12/2006 Montagu et al.

FOREIGN PATENT DOCUMENTS

JP 2002-001102 1/2002
JP 2002-239317 8/2002
JP 2003-220322 8/2003
JP 2005-240647 9/2005

* cited by examiner

*Primary Examiner*—Stephen Hepperle
*Assistant Examiner*—Craig M Schneider
(74) *Attorney, Agent, or Firm*—Bachman & LaPointe, P.C.

(57) ABSTRACT

There is provided a microfluidic device capable of preventing the flow of a fluid from being interrupted by bubbles generated in a micro flow passage. In a microfluidic device 10 wherein a micro flow passage 16 having a substantially constant height is formed for allowing a fluid to flow therein and wherein a narrow portion is formed in a portion of the micro flow passage by forming a columnar portion 12*c* or the like in the micro flow passage, an extending recessed portion 14*c* for extending the micro flow passage upwards is formed upstream of the narrow portion, and a plurality of raised portions extending in substantially parallel to longitudinal directions of the micro flow passage are formed on a portion of the bottom face of the micro flow passage facing the extending recessed portion if necessary.

9 Claims, 8 Drawing Sheets

MICROFLUIDIC DEVICE FOR TRAPPING AIR BUBBLES

BACKGROUND OF THE INVENTION

1. Field of the Invention

The present invention generally relates to a microfluidic device. More specifically, the invention relates to a microfluidic device in which a micro flow passage, such as a microchannel, is formed.

2. Description of the Prior Art

In recent years, there is known a technique called integrated chemistry for using a microfluidic device, such as a microchip, wherein a micro flow passage (a fine flow passage) having a width and depth of about tens to two hundreds micrometers is formed in a substrate of a glass or plastic, to utilize the micro flow passage as a fluid passage or a reaction vessel, to integrate a complicated chemical system in the microfluidic device. According to such integrated chemistry, a microchip capable of being used in various tests is called μ-TAS (Total Analytical System) if the use of the microchip is limited to analytical chemistry, and the microchip is called micro reactor if the use of the microchip is limited to a reaction. When any one of various tests (any one or combination of operations and means, such as analysis, measurement, synthesis, decomposition, mixing, molecular transportation, solvent extraction, solid phase extraction, phase separation, phase combination, molecule acquisition, culture, heating and cooling) is carried out, integrated chemistry has advantages that the time to transport diffuse molecules can be short since the space in the microchip is small and that the heat capacity of a liquid phase is very small. Therefore, integrated chemistry is noticed in the technical field wherein a micro space is intended to be utilized for carrying out analysis and chemical synthesis.

As such microfluidic devices, there are known microfluidic devices wherein a micro flow passage having any one of various shapes is formed (see, e.g., Japanese Patent Laid-Open Nos. 2002-1102, 2002-239317 and 2003-220322). As methods for forming a micro flow passage in such a microfluidic device, there are known various methods (see, e.g., Japanese Patent Laid-Open No. 2005-230647).

However, when a fluid is allowed to pass through a micro flow passage in such a microfluidic device, there are some cases where air having stayed in the micro flow passage and/or air generated by a pump or the like forms bubbles in the micro flow passage to interrupt the flow of the fluid in the micro flow passage. Particularly in a microfluidic device wherein a narrow portion (a portion having a small flow passage cross-sectional area) is formed in a part of a micro flow passage by providing a columnar portion (a pillar) or the like for allowing the mixing of fluids, a vital reaction or the like in the micro flow passage, there are some cases where bubbles stay in the narrow portion to interrupt the flow of the fluid.

SUMMARY OF THE INVENTION

It is therefore an object of the present invention to eliminate the aforementioned problems and to provide a microfluidic device capable of preventing the flow of a fluid from being interrupted by bubbles generated in a micro flow passage.

In order to accomplish the aforementioned and other objects, according to one aspect of the present invention, a microfluidic device comprises: a device body; a flow passage, formed in the device body, for allowing a fluid to flow therein; and a bubble trapping means for trapping a bubble in the flow passage to prevent the bubble from reaching a predetermined region in the flow passage while allowing the fluid to flow therein, wherein the bubble trapping means is a recessed portion which is formed in an upper surface of the flow passage upstream of the predetermined region so as to extend the flow passage upwards. In this microfluidic device, the recessed portion preferably extends the flow passage upwards insubstantially vertical directions, and preferably extends in lateral directions which are substantially perpendicular to longitudinal directions of the flow passage. The flow passage preferably has a height which is substantially constant in other portions than the recessed portion. A narrow portion for preventing the bubble from passing through the flow passage may be formed in the predetermined region in the flow passage. In this case, the narrow portion may be formed by a columnar portion provided in the flow passage, and the flow passage preferably has a height which is not greater than a width of the narrow portion in a portion adjacent to the recessed portion downstream of the recessed portion. In addition, a plurality of raised portions extending in substantially parallel to longitudinal directions of the flow passage may be formed on a portion of a bottom face of the flow passage facing the recessed portion. In this case, each of the plurality of raised portions preferably has an upper surface which is inclined so as to gradually raise the bottom face of the flow passage from the upstream toward downstream in the flow passage, and a distance between adjacent two of the plurality of raised portions is not preferably greater than the width of the narrow portion.

According to the present invention, an extending recessed portion (a stepped portion) for extending a micro flow passage of a microfluidic device upwards is formed upstream of a predetermined region in which a test or the like is carried out in the micro flow passage, e.g., upstream of a narrow portion of the micro flow passage which is narrowed by columnar portions (pillars) provided in the micro flow passage. Thus, it is possible to trap bubbles in the extending recessed portion to prevent the bubbles from reaching the predetermined region, such as the narrow portion, so that it is possible to prevent the flow of a fluid from being interrupted by the bubbles generated in the micro flow passage.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

Figure 1:
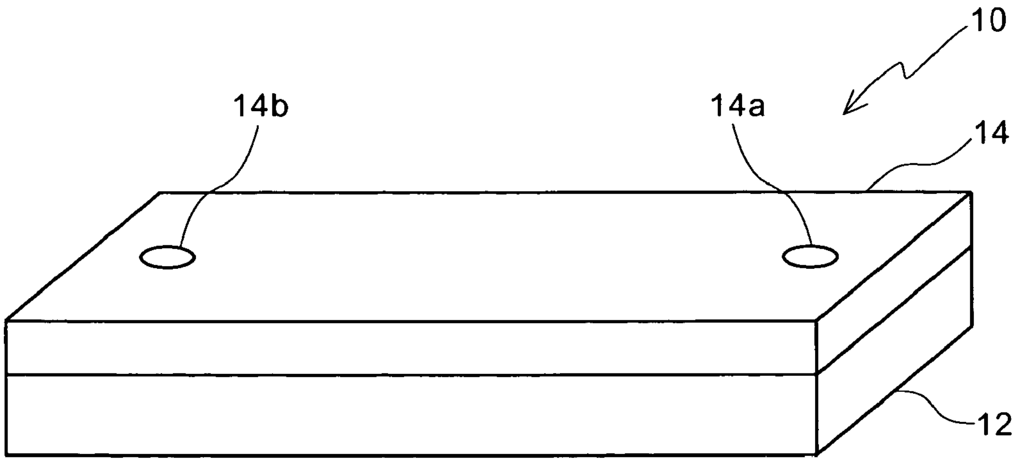
FIG. 1 is a perspective view of the first preferred embodiment of a microfluidic device according to the present invention.
Figure 2:
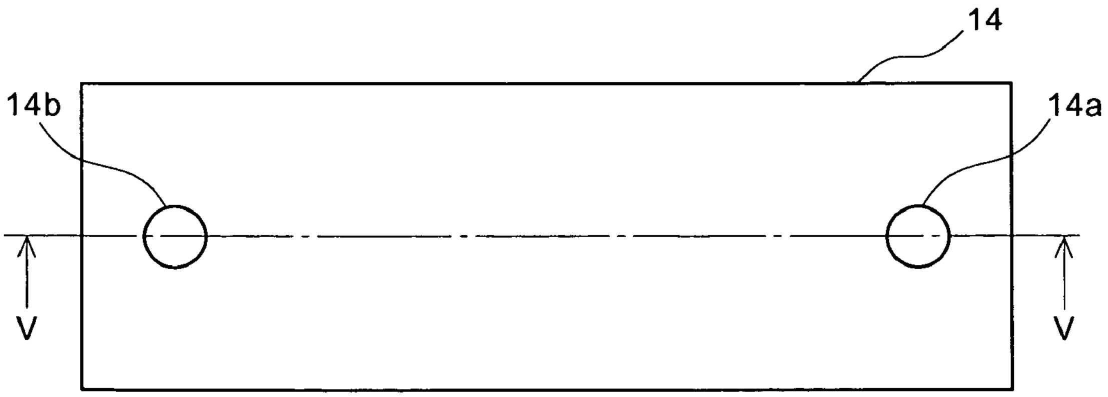
FIG. 2 is a plan view of the microfluidic device of FIG. 1.
Figure 8:
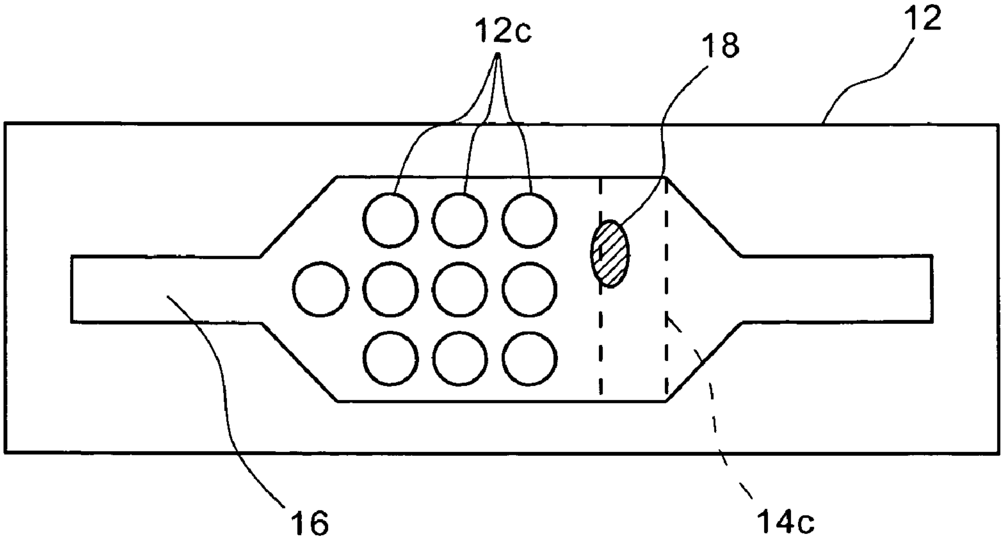
Figure 9:
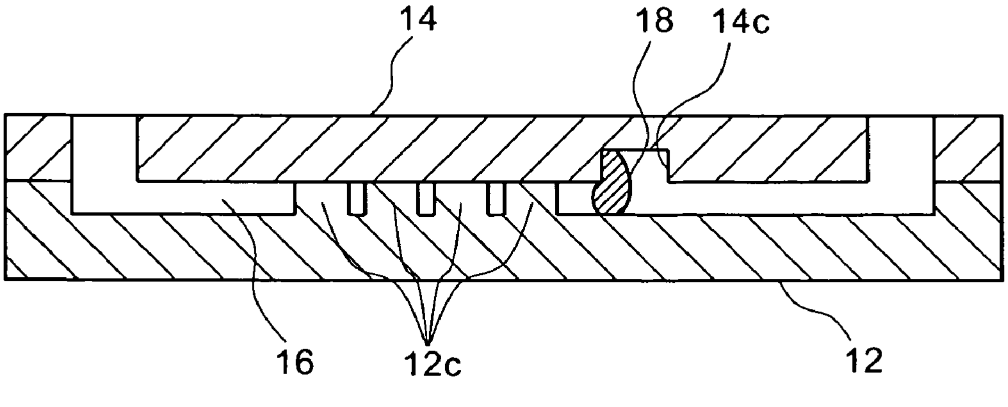
Figure 10:
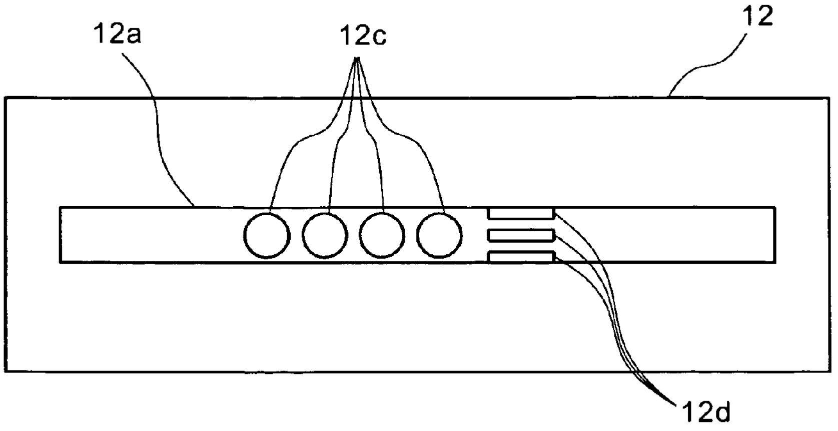
Figure 11:
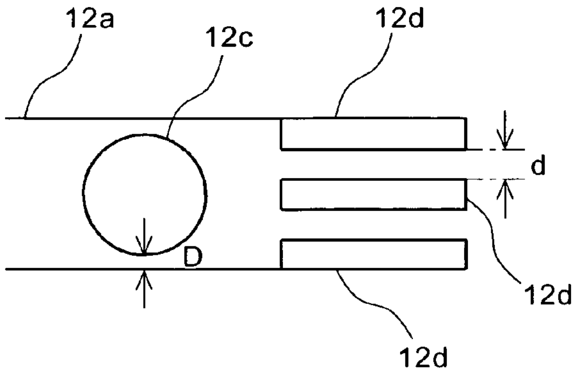
Figure 12:
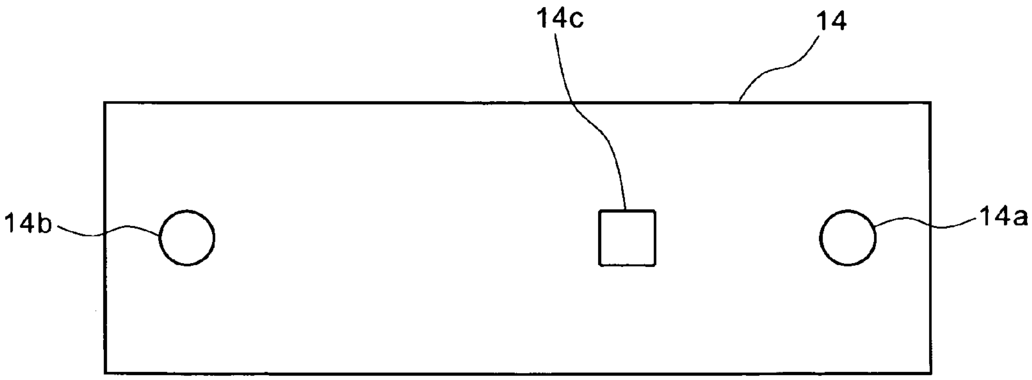
Figure 13:
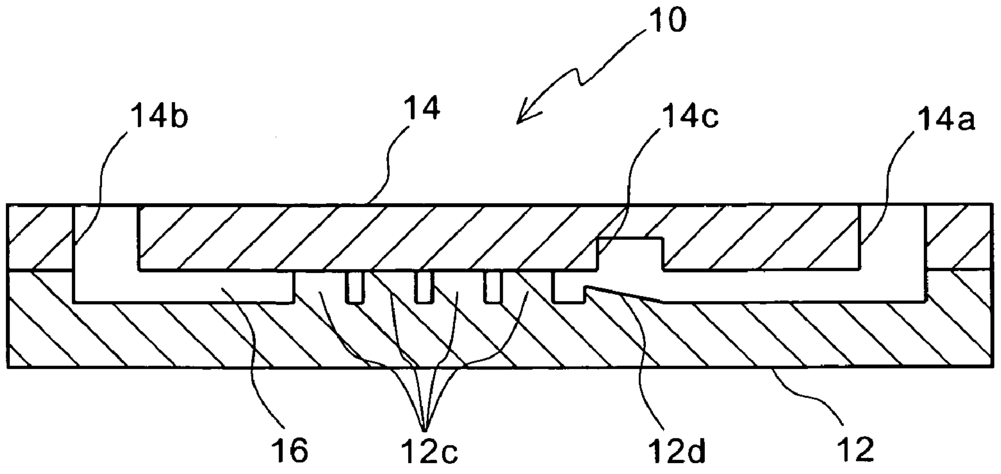
Figure 14:
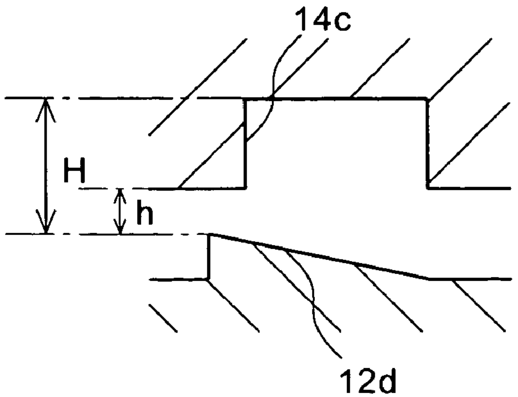
Figure 15:
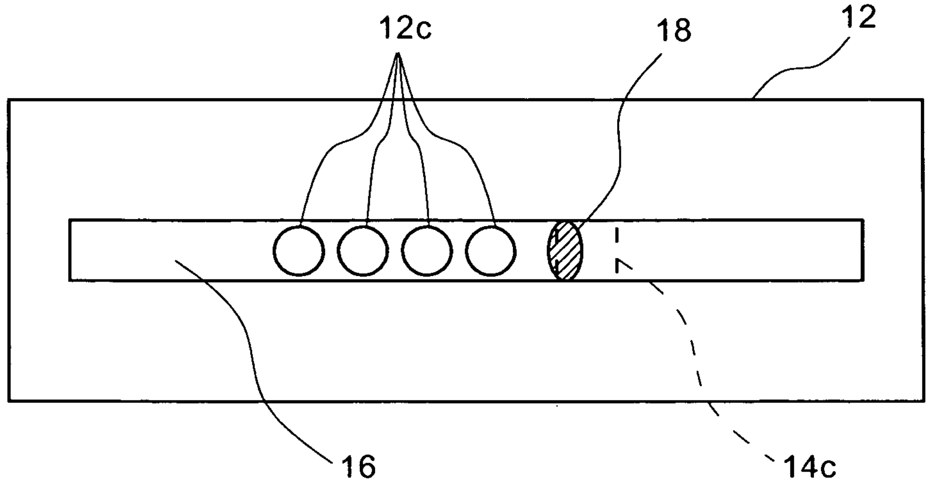
Figure 16:
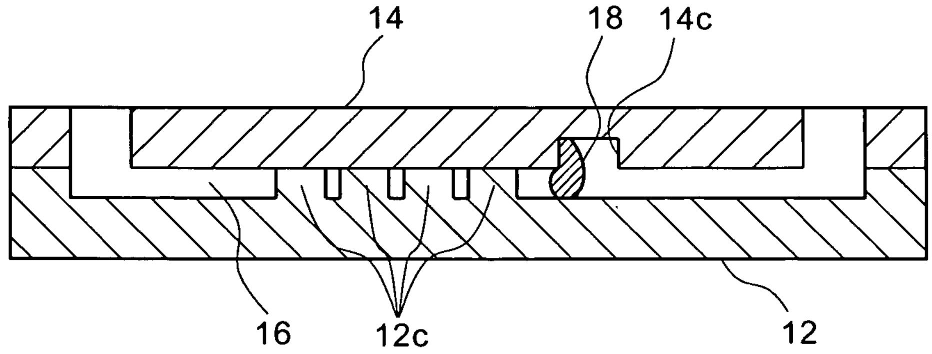
Figure 17:
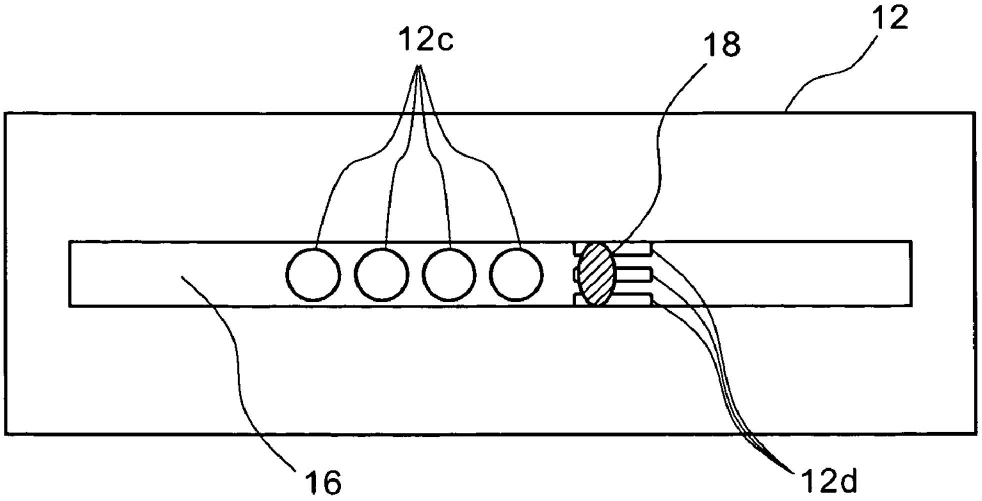
Figure 18:
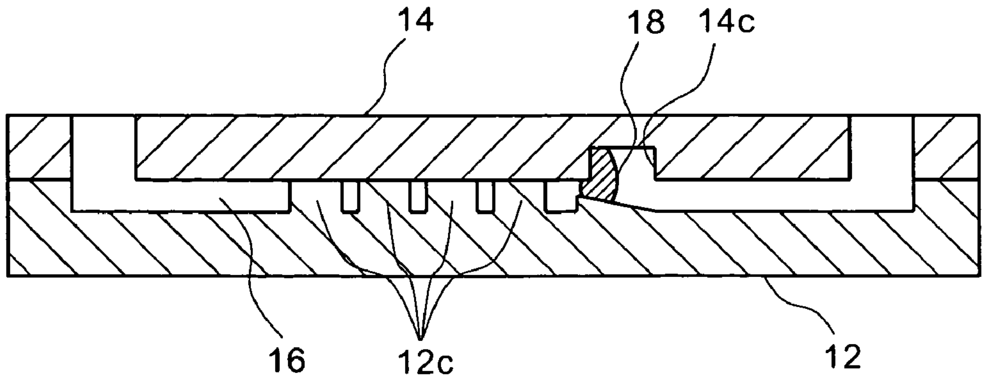

1 is not provided, as an illustration for explaining a state that the flow of a fluid is interrupted by a bubble if the extending recessed portion is not provided;

FIG. 8 is a plan view of the lower plate member of the microfluidic device of FIG. 1, as an illustration for explaining a state that a bubble is trapped in an extending recessed portion (shown by broken lines) which is formed in the upper plate member;

FIG. 9 is a sectional view of the microfluidic device of FIG. 1, as an illustration for explaining a state that a bubble is trapped in the extending recessed portion;

FIG. 10 is a plan view of a lower plate member of the second preferred embodiment of a microfluidic device according to the present invention;

FIG. 11 is an enlarged plan view of a part (including an extending recessed portion and raised portions) of the lower plate member of FIG. 10;

FIG. 12 is a bottom view of an upper plate member of the second preferred embodiment of a microfluidic device according to the present invention;

FIG. 13 is a sectional view of the second preferred embodiment of a microfluidic device according to the present invention;

FIG. 14 is an enlarged sectional view of a part (including an extending recessed portion and raised portions) of the microfluidic device of FIG. 13;

FIG. 15 is a plan view of a lower plate member if the raised portions in the microfluidic device of FIG. 10 are not provided, as an illustration for explaining a state that the flow of a fluid is interrupted by a bubble trapped in an extending recessed portion (shown by broken lines) formed in an upper plate member if the raised portions are not provided;

FIG. 16 is a sectional view of a microfluidic device if the raised portions in the microfluidic device of FIG. 10 are not provided, as an illustration for explaining a state that the flow of a fluid is interrupted by a bubble if the raised portions are not provided;

FIG. 17 is a plan view of a lower plate member of the microfluidic device of FIG. 10, as an illustration for explaining a state that a bubble is trapped in an extending recessed portion while the raised portions prevent the flow of a fluid from being interrupted by the bubble; and FIG. 18 is a sectional view of the microfluidic device of FIG. 10, as an illustration for explaining a state that a bubble is trapped in an extending recessed portion while the raised portions prevent the flow of a fluid from being interrupted by the bubble.

DESCRIPTION OF THE PREFERRED EMBODIMENTS

Referring now to the accompanying drawings, the preferred embodiments of a microfluidic device according to the present invention will be described below in detail.

FIGS. 1 through 5 show the first preferred embodiment of a microfluidic device according to the present invention. As shown in FIG. 1, a microfluidic device 10 in this preferred embodiment comprises a lower plate member (a substrate member) 12 and an upper plate member (a lid member) 14, which are stuck on each other and which have a substantially rectangular planar shape. The lower plate member 12 and the upper plate member 14 are made of, e.g., a resin material, such as polycarbonate (PC) or polymethyl methacrylate (PMMA), or a glass material.

Figure 3:
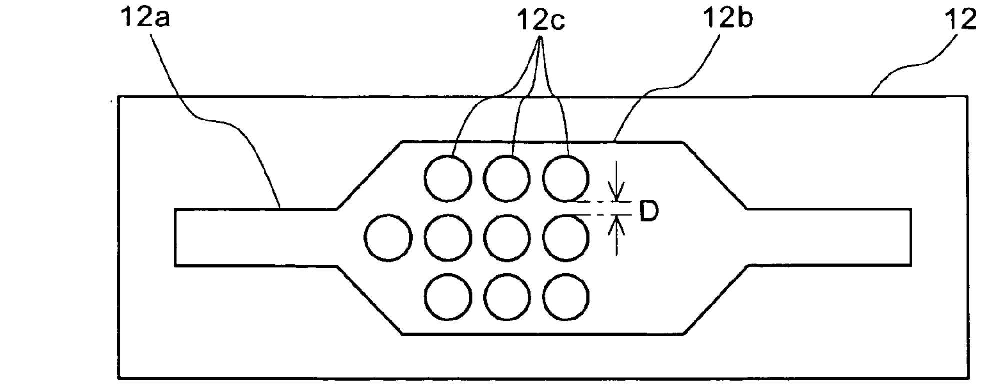
FIG. 3 is a plan view of a lower plate member of the microfluidic device of FIG. 1.
Figure 4:
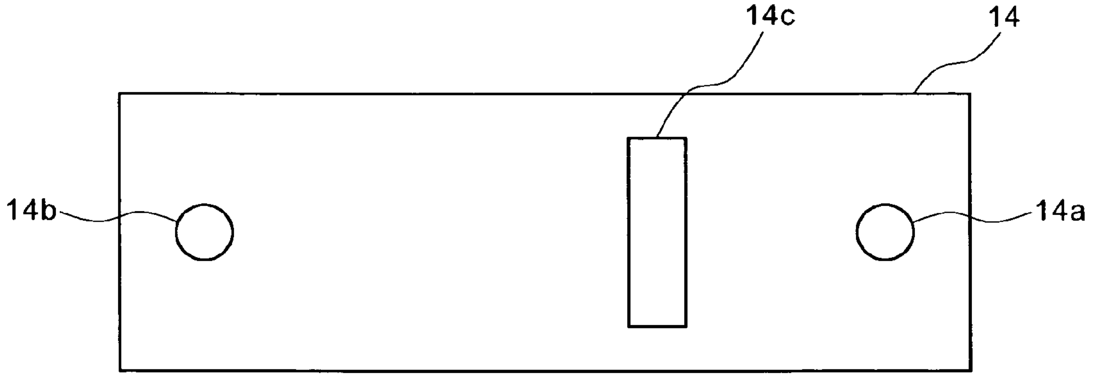
FIG. 4 is a bottom view of an upper plate member of the microfluidic device of FIG. 1.
Figure 5:
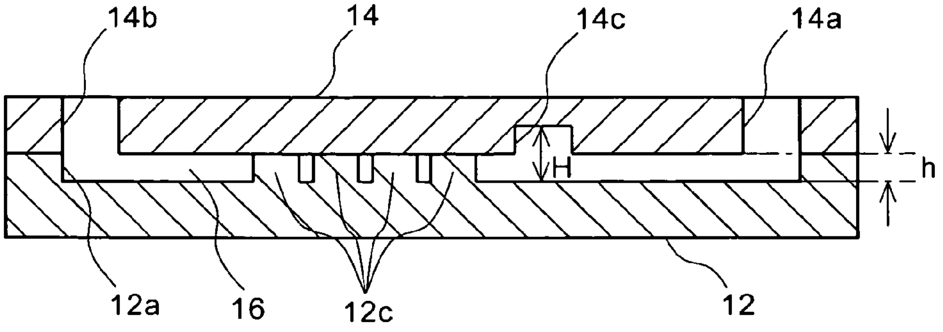
FIG. 5 is a sectional view taken along line V-V of FIG. 2.

As shown in FIGS. 3 and 5, the lower plate member 12 has an elongated linear fine groove **12*a* which extends in longitudinal directions in a substantially central portion of a surface (upper surface) thereof facing the upper plate member 14. The fine groove 12*a* has a substantially rectangular cross-section, each side of which has a length (width and depth) of about 1 through 100 micrometers, and has a length of a few centimeters. The fine groove 12*a* has a widened portion 12*b* which is formed in a substantially central portion in longitudinal directions so as to increase the width thereof. In the widened portion 12*b*, a plurality of substantially cylindrical columnar portions (pillars) 12*c* for allowing the mixing of fluids, a vital reaction or the like are formed at intervals (D) so as to project in substantially vertical directions from the bottom face of the fine groove 12*a* to have a height which is substantially equal to the depth of the fine groove 12*a***.

As shown in FIGS. 1, 2, 4 and 5, the upper plate member 14 has a through hole (inlet) **14*a* having a substantially circular cross-section, which is communicated with one end of the fine groove 12*a* and which opens to the outside. The upper plate member 14 also has a through hole (outlet) 14*b* having a substantially circular cross-section, which is communicated with the other end of the fine groove 12*a* and which opens to the outside. Moreover, the upper plate member 14 has a substantially rectangular extending recessed portion 14*c* having a substantially constant depth upstream of the columnar portions 12*c* in the widened portion 12*b* of the fine groove 12*a* so that the extending recessed portion 14*c* faces the widened portion 12*b* and extends in directions substantially perpendicular to longitudinal directions of the fine groove 12*a*. As will be described later, the extending recessed portion 14*c*** functions as a bubble trapping means for trapping bubbles.

If the upper plate member 14 is bonded to the above described lower plate member 12 by means of an adhesive or the like, the opening portion of the fine groove **12*a* is closed by the upper plate member 14, so that a micro flow passage 16 having a substantially constant height is formed therebetween. Thus, a microfluidic device 10 in this preferred embodiment shown in FIGS. 1 and 5 can be produced. In the microfluidic device 10 in this preferred embodiment thus produced, a region of the widened portion 12*b* downstream of the extending recessed portion 14*c* can be used as a region for carrying out any one of various tests (any one or combination of operations and means, such as analysis, measurement, synthesis, decomposition, mixing, molecular transportation, solvent extraction, solid phase extraction, phase separation, phase combination, molecule acquisition, culture, heating and cooling), and particularly as a region for allowing the mixing of fluids, a vital reaction or the like. Furthermore, the relationship between the height h of the micro flow passage 16 (the height of a portion of the micro flow passage 16 adjacent to the extending recessed portion 14*c* downstream of the extending recessed portion 14*c* if the height of the micro flow passage 16 is not substantially constant as this preferred embodiment) and the sum H of the height of the micro flow passage 16 and depth of the extending recessed portion 14*c* is $h<H$, and the relationship between the height h of the micro flow passage 16 and the distance D between adjacent two of the columnar portions 12*c*** is preferably $h \leqq D$.

Figure 6:
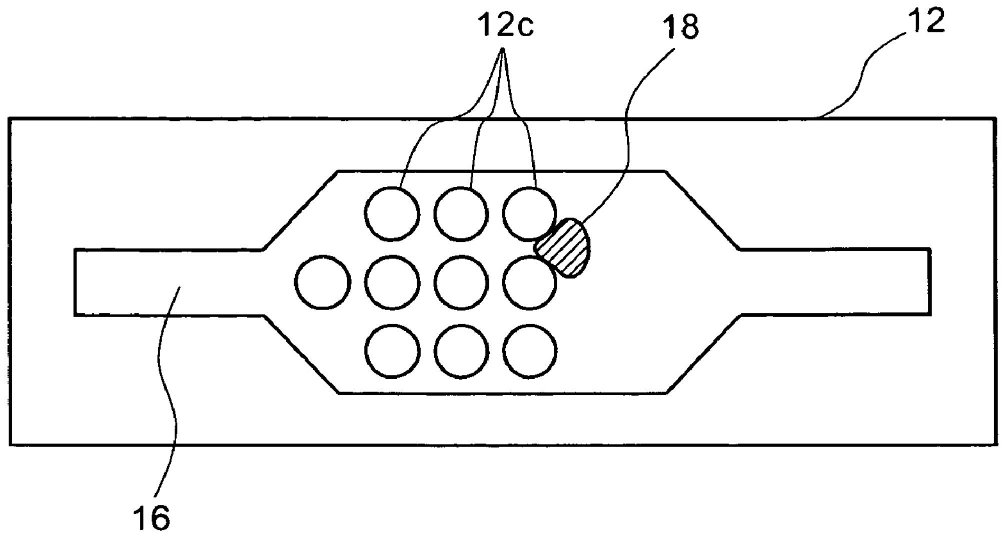
FIG. 6 is a plan view of a lower plate member if the extending recessed portion in the microfluidic device of FIG. 1 is not provided, as an illustration for explaining a state that the flow of a fluid is interrupted by a bubble if the extending recessed portion is not provided.
Figure 7:
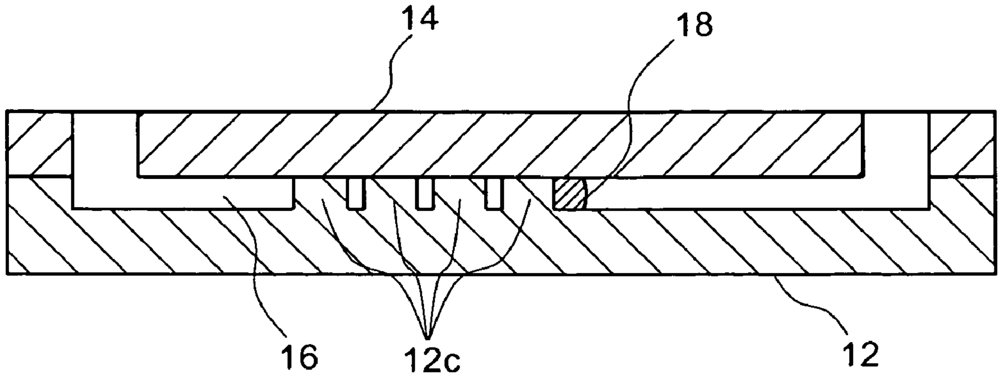
FIG. 7 is a sectional view of a microfluidic device if the extending recessed portion in the microfluidic device of FIG.

Referring to FIGS. 6 through 9, the operation of the above described microfluidic device 10 in this preferred embodiment will be described below. If the extending recessed portion **14*c* as the microfluidic device 10 in this preferred embodiment is not provided, a gas, such as air having stayed in the micro flow passage 16 or air generated by a pump or the like when a fluid is allowed to flow in the micro flow passage 16, forms a bubble 18 in the micro flow passage 16 to stay in a narrow portion between adjacent two of the columnar portions 12*c* as shown in FIGS. 6 and 7 to interrupt the flow of the fluid in the micro flow passage 16. However, if the extending recessed portion 14***c* is provided as the microfluidic device 10 in this preferred embodiment, the generated bubble 18 is trapped in the extending recessed portion 14*c* as shown in FIGS. 8 and 9, so that the flow of the fluid in the micro flow passage 16 is not interrupted.

FIGS. 10 through 14 show the second preferred embodiment of a microfluidic device according to the present invention. The perspective and plan views of the microfluidic device in this preferred embodiment are omitted since they are substantially the same as FIGS. 1 and 2. The microfluidic device in this preferred embodiment substantially has the same constructions as those in the above described first preferred embodiment, except that a fine groove 12*a* of a lower plate member 12 does not have the widened portion 12*b* and that a plurality of raised portions 12*d* are formed on the bottom face of the fine groove 12*a* of the lower plate member 12 so as to face an extending recessed portion 14*c*. Therefore, the description of portions having the same constructions as those in the above described first preferred embodiment is omitted.

In this preferred embodiment, the fine groove 12*a* of the lower plate member 12 of the microfluidic device 10 does not have the widened portion 12*b*, and columnar portions 12*c* are arranged in a row. In addition, a plurality of raised portions 12*d* extending in substantially parallel to longitudinal directions of the fine groove 12*a* are formed on a portion of the bottom face of the fine groove 12*a* facing the extending recessed portion 14*c*. As shown in FIGS. 13 and 14, the upper surface of each of the raised portions 12*d* is inclined so as to gradually raise the bottom face of the fine groove 12*a* from the upstream toward downward in the fine groove 12*a*, and the downstream end of each of the raised portions 12*d* having the maximum height is arranged between a portion of the bottom face of the fine groove 12*a* facing the extending recessed portion 14*c* and the columnar portions 12*c*. Furthermore, the relationship between the height h of the micro flow passage 16 at the downstream end, at which the height of each of the raised portions 12*d* is maximum, and the minimum height H of the micro flow passage 16 in the portion of the bottom face of the fine groove 12*a* facing the extending recessed portion 14*c* is $h<H$. In addition, the relationship between the distance D between the columnar portions 12*c* and the side face of the fine groove 12*a*, and the height h is preferably $h \leqq D$, and the relationship between the distance D and the distance d between adjacent two of the raised portions 12*d* is preferably $d \leqq D$.

While the downstream end of each of the raised portions 12*d* having the maximum height has been arranged between the portion of the bottom face of the fine groove 12*a* facing the extending recessed portion 14*c* and the columnar portions 12*c* in this preferred embodiment as shown in FIGS. 13 and 14, the present invention should not be limited thereto. The downstream end of each of the raised portions 12*d* having the maximum height may be arranged in a portion of the bottom face of the fine groove 12*a* facing the extending recessed portion 14*c*. The portion of each of the raised portions 12*d* having the maximum height is not always required to be the downstream end of each of the raised portions 12*d*.

Referring to FIGS. 15 through 18, the operation of the microfluidic device in the above described second preferred embodiment will be described below. If the raised portions 12*d* as the microfluidic device 10 in this preferred embodiment are not provided, a gas, such as air having stayed in the micro flow passage 16 or air generated by a pump or the like when a fluid is allowed to flow in the micro flow passage 16, forms a bubble 18 in the micro flow passage 16, so that the generated bubble 18 is trapped in the extending recessed portion 14*c* upstream of the columnar portions 12*c* as shown in FIGS. 15 and 16. Then, since the width of the bubble 18 is substantially equal to the width of the micro flow passage 16, the bubble 18 staying therein interrupts the flow of the fluid in the micro flow passage 16. However, if the plurality of raised portions 12*d* are provided as the microfluidic device 10 in this preferred embodiment, even if the generated bubble 18 is trapped in the extending recessed portion 14*c* as shown in FIGS. 17 and 18, the fluid can flow through spaces formed between the raised portions 12*d*, so that the flow of the fluid in the micro flow passage 16 is not interrupted.

Furthermore, if the microfluidic device 10 according to the present invention can trap bubbles upstream of a region in which it is required to prevent bubbles from entering, such as a region for allowing the mixing of fluids, a vital reaction or the like, or upstream of a narrow region, such as a region in which the columnar portions 12*c* in the micro flow passage 16 are provided, the extending recessed portion 14*c* preferably has a sufficiently large size to such an extent that the flow of a fluid in the micro flow passage 16 is not interrupted.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A microfluidic device comprising:

a device body;

a flow passage, formed in the device body, for allowing a fluid to flow therein; and a bubble trapping means for trapping a bubble in the flow passage to prevent the bubble from reaching a predetermined region in the flow passage while allowing the fluid to flow therein, said bubble trapping means being a recessed portion which is formed in an upper surface of said flow passage upstream of said predetermined region so as to extend said flow passage upwards, and a plurality of raised portions extending in substantially parallel to longitudinal directions of said flow passage, said plurality of raised portions being formed on a portion of a bottom face of said flow passage facing said recessed portion.

2. A microfluidic device as set forth in claim 1, wherein said recessed portion extends said flow passage upwards in substantially vertical directions.

3. A microfluidic device as set forth in claim 1, wherein said recessed portion extends in lateral directions which are substantially perpendicular to longitudinal directions of said flow passage.

4. A microfluidic device as set forth in claim 1, wherein said flow passage has a height which is substantially constant in other portions than said recessed portion.

5. A microfluidic device as set forth in claim 1, wherein a narrow portion for preventing said bubble from passing through said flow passage is formed in said predetermined region in said flow passage.

6. A microfluidic device as set forth in claim 5, wherein said narrow portion is formed by a columnar portion in said flow passage.

7. A microfluidic device as set forth in claim 5, wherein said flow passage has a height which is not greater than a width of said narrow portion in a protion adjacent to said recessed portion downstream of said recessed portion.

8. A microfluidic device as set forth in claim 1, wherein each of said plurality of raised portions has an upper surface which is inclined so as to gradually raise the bottom face of said flow passage from the upstream toward downstream in said flow passage.

9. A microfluidic device as set forth in claim 8, wherein a distance between adjacent two of said plurality of raised portions is not greater than the width of said narrow portion.

* * * * *